United States Patent Office 3,212,845
Patented Oct. 19, 1965

3,212,845
REMOVAL OF VANADIUM FROM
AQUEOUS SOLUTIONS
James L. Hart and Robert E. Reusser, Bartlesville, Okla., assignors to Phillips Petroleum Company, a corporation of Delaware
No Drawing. Filed Dec. 12, 1960, Ser. No. 75,079
2 Claims. (Cl. 23—14.5)

This invention relates to the removal of vanadium from aqueous solutions. In one aspect, it relates to the removal of soluble uranium values from aqueous basic solutions, such as the pregnant uranium-containing liquor obtained by the carbonate leaching of uranium ore, or the leach solution obtained by leaching roasted yellow cake comprising sodium diuranate. In another aspect, it relates to an improved process for obtaining a relatively pure yellow cake product having a low vanadium content. In a further aspect, it relates to the preparation of a novel substrate or contact material for removing vanadium values from aqueous solutions.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyanumite, etc., but it is especially useful in leaching ore of high carbonate content. It is this leaching process that is the concern of the subject invention.

The carbonate leaching process for extracting uranium values from the uranium-bearing materials comprises contacting crushed uranium-bearing ore with hot recycle aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a plurality of vacuum drum filters operated in series, and after the pregnant leach solution is clarified, for example by filtering it through a precoated drum filter, the soluble uranium values are precipitated from the pregnant liquor by the addition of an excess of caustic, such as sodium hydroxide. This addition of sodium hydroxide neutralizes the bicarbonate present and then causes the soluble uranium values to precipitate as sodium diuranate (this precipitate is commonly called "yellow cake"). The solution containing the precipitated yellow cake is then thickened and separated, for example by filtering the thickened solution in a rotary filter. The yellow cake is then dried and packaged. The hydroxide-carbonate solution recovered as overflow during the thickening of the caustic-treated pregnant solution is commonly referred to as "barren liquor" and it is recarbonated by passing carbon dioxide through it, using for example a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Other metals and nonmetals are commonly associated with uranium-bearing material. The principal metal commonly associated with uranium-bearing materials is vanadium, although other metals such as zirconium, iron, titanium, barium, aluminum, silicon, antimony, and cobalt, and nonmetallic elements such as phosphorus are commonly associated with uranium-bearing materials. These other metals and nonmetals, especially vanadium, are commonly extracted with the uranium values in the carbonate leaching step and gradually build up in concentration in the process. For example, a typical secondary uranium ore such as coffinite will contain about 0.25 percent $U_3O_8$ and 0.1 percent $V_2O_5$, and during the leaching step about 10 to 20 percent of the vanadium present in the ore will also be leached. During the subsequent precipitation of the pregnant leach solution with caustic, some of the vanadium values present in the pregnant liquor will also be precipitated together with the uranium values, for example 40 to 60 percent of the $V_2O_5$ present in the pregnant liquor will precipitate with the yellow cake. In fact, up to 85 percent of the vanadium extracted from the ore may appear in the yellow cake produced. The other metals and nonmetals, present as impurities in the pregnant liquor, will also tend to be precipitated with the yellow cake or become occluded therein. Thus, an impure yellow cake product is often obtained, and, for example, the vanadium content of the yellow cake will often be considerable, e.g., 2 to 7 weight percent.

The presence of these other metals and nonmetals in the yellow cake, especially the presence of vanadium, is undesirable because it renders the subsequent conversion of the yellow cake into uranium metal, or into other uranium compounds such as the hexachloride, much more difficult. The Atomic Energy Commission, a major purchaser of yellow cake produced in this country, penalizes producers of yellow cake if the purity of the yellow cake is not as high as desirable, and it will even refuse to purchase such impure yellow cake. In the case of the vanadium impurity, the Atomic Energy Commission may exact a price penalty if the vanadium content, expressed as $V_2O_5$, exceeds, for example, two weight percent of the $U_3O_8$ in the yellow cake, or the AEC may refuse to buy the yellow cake if the vanadium contaminant content is excessive. In many cases, the vanadium content of the yellow cake may be as high as 6 or 7 percent of the $U_3O_8$ content.

One method which has been proposed and used heretofore for purifying the yellow cake is that which involves heating or roasting the same with a high melting sodium salt, such as, sodium carbonate (M.P. 851° C.) or sodium chloride (M.P. 800.4° C.), sometimes together with sawdust, after which the roasted yellow cake is leached with water to dissolve the solubilized vanadium. The resulting slurry of insoluble, purified yellow cake and leach solution containing soluble vanadium values is then filtered to recover the purified yellow cake. The vanadium values present in the leach solution filtrate can then be recovered by acidifying the leach solution to precipitate the vanadium values as sodium hexametavanadate. While this roasting method, using the high melting sodium salt, has enjoyed some success, this method generallly requires relatively high roasting temperatures on the order of 850° C. or higher, thus necessitating relatively high fuel costs and requiring frequent repairs of the roasting furnace. Another disadvantage of this roasting method resides in the fact that some of the uranium values are also solubilized, such solubilization consequently resulting in the loss of a small but valuable amount of the uranium values. For these reasons, and others, this roasting method, using relatively high roasting temperatures and high melting sodium salts, has not solved the need for an improved method of producing a purer yellow cake, or recovering vanadium values.

Accordingly, an object of this invention is to remove soluble vanadium values from aqueous solutions. Another object is to provide an improved method of removing soluble vanadium values from the pregnant uranium-containing liquor obtained by the carbonate leach of uranium ore. Another object is to provide an improved method of removing soluble vanadium values from the pregnant vanadium-containing liquor obtained by leaching roasted yellow cake. Another object is to provide an improved method for obtaining a relatively pure yellow cake product having a low vanadium content. Another object is to improve the recovery of uranium from uranium-bearing ores. Another object is to provide a novel substrate or contact material for removing soluble vanadium values from an aqueous solution. Other objects and advantages of this invention will become apparent to those skilled in the art from the following discussion and appended claims.

Briefly stated, in one of its broader aspects, this invention provides a method whereby an aqueous solution containing soluble vanadium values, such as the basic pregnant liquor of the carbonate leaching process, is contacted with a liquid permeable bed or column comprising discrete bodies of metallic lead, such as lead shot, which have been treated with an aqueous hydrogen peroxide solution, preferably a dilute sulfuric acid solution containing hydrogen peroxide. The thus treated metallic lead forms a substrate which, upon contact with the aqueous solution containing vanadium values, removes the latter from the solution as insoluble lead vanadate, this lead salt remaining in or adhering to the lead substrate. When the substrate becomes sufficiently loaded with lead vanadate, the vanadium values are removed from the loaded substrate, for example by eluting the same with a solvent such as aqueous sulfuric acid or aqueous sulfurous acid, the soluble vanadium values can then be recovered from the column effluent, for example by further acidifying the effluent to precipitate the soluble vanadium values as metavanadic acid which compound can be melted and dehydrated to vanadium pentoxide. Following the removal of the vanadium values from the loaded substrate, the latter can be regenerated and washed, if necessary.

The solution of hydrogen peroxide used to treat the lead substrate can vary in concentration but generally for most applications this solution will have a concentration between about 0.5 and 10 weight percent of $H_2O_2$. If aqueous sulfuric acid is employed as a solvent, the normality, with respect to $H_2SO_4$, will usually be in a range between about 1 and 10 N. A satisfactory substrate can be prepared by using commercial lead shot which has been cleaned of its graphite coating, for example with nitric acid. The cleaned lead shot is treated with sufficient hydrogen peroxide solution to cover the lead shot for a period of time generally within the range of 10 minutes and 25 hours, or longer. One treating step will be adequate in many cases, although the treating step can be repeated one or more times if desired. Following the treatment of the lead shot with hydrogen peroxide, it is generally advisable to wash the treated lead shot with water.

The treated lead shot can be packed in any suitable column or other vessel such as a plate-frame filter press in the form of a liquid permeable bed. The density of the bed can vary, but it should be understood that it is sufficiently permeable to allow the aqueous, vanadium-containing solution and other solutions to pass or percolate through the lead substrate. The vanadium values present in the aqueous solutions can be removed by either batch-wise operations or semi-continuous operations using two or more beds of the permeable substrate.

The lead substrate of this invention can be employed to remove the soluble vanadium values from any aqueous solution containing the same. For example, it can be used to remove perferentially or selectively the vanadium values in the pregnant liquor of the carbonate leaching process which ordinarily contains from 0.2 to 20 grams of $V_2O_5$ per liter in addition to soluble uranium values. Vanadium-containing leach solutions obtained by leaching roasted yellow cake can also be treated according to this invention, the $V_2O_5$ content of these leach solutions or liquors containing soluble vanadium values, such as that used as filter wash or mill solution in the carbonate leaching process, can also be treated according to this invention. Generally, the aqueous vanadium-containing solutions treated according to this invention will contain from about 0.1 to 60 grams per liter of $V_2O_5$, although solutions containing lower or greater amounts of $V_2O_5$ can also be treated. Such solutions can be passed through or percolated through the substrate of this invention until the substrate becomes sufficiently loaded with lead vanadate. This loading need not be complete, especially where two or more columns are used in parallel, whereby an unloaded column can be switched to when the other column is 60 to 80 percent loaded.

After the substrate is loaded to the desired extent with lead oxide or a mixture of lead oxide and lead sulfate, the vanadium values can be removed by passing a suitable solvent, such as dilute sulfuric acid or dilute sulfurous acid, through the loaded bed to elute the vanadium values. Where sulfurous acid is used, it can be supplied by passing $SO_2$ through the wet loaded bed. The concentration of such acids can vary, but generally will be in the range between 1 to 15 N, preferably 5 to 10 N. Stoichiometrically, five grams of the lead oxide or sulfate compound will react with about one gram of $V_2O_5$. Thus, the amount of vanadium-containing solution which can be treated will depend upon the amount of lead compound on the substrate, the amount of total substrate, and concentration of the vanadium solution. Following the elution step, the column can be washed with water, for example 1 to 10 volumes of water per volume of sulfurous or sulfuric acid used in the elution step. The soluble vanadium values in the column effluent, either as vanadic acid where sulfurous acid is used for elution or vanadyl sulfate where sulfuric acid is used for elution, can be recovered by further acidification or other conventional means.

Following the removal of the vanadium values from the loaded substrate, the latter can be regenerated by again contacting the same with an aqueous hydrogen peroxide solution, preferably dilute sulfuric acid containing hydrogen peroxide. After the regeneration step, the column can be washed with water preparatory to using it again in removing vanadium values from other aqueous solutions or batches of solution.

The following examples further illustrate the subjects and advantages of this invention, but it should be understood that the various materials, conditions of treatment, etc., given in these examples are merely illustrative and should not be construed to unduly limit this invention.

EXAMPLE I

Lead shot (No. 8 Chill) in the amount of 286.8 g. was washed with concentrated $HNO_3$ to remove the graphite coating. The shot was then washed with water to remove residual $HNO_3$ and then placed in a ⅝″ column to a height of about 8″. The column of cleaned lead shot was then covered with a 4 wt. percent aqueous solution of $H_2O_2$ and let stand for one hr. The treating solution was then drained off and the shot was treated twice more for 1 hr. each with fresh batches of said $H_2O_2$ solution. The column was then drained and washed with water.

The column of substrate prepared as described above was then employed to remove vanadium values from a number of batches of pregnant liquor from a carbonate leaching process. This pregnant liquor contained 1.04 g./l. $V_2O_5$, 3.87 g./l. $U_3O_8$, 21.9 g./l. $Na_2CO_3$, 15.62 g./l. $NaHCO_3$, and 107.3 g./l. $Na_2SO_4$. The pH of the pregnant liquor was approximately 9.5.

Four 100 ml. batches of the pregnant liquor were passed successively through the above-described column of lead substrate and the $V_2O_5$ content of the effluent of each batch was determined by colorimetric analysis. The total amount of $V_2O_5$ removed from all four batches was 0.048 g. The column was then eluted with 6 N aqueous $H_2SO_4$ and 0.032 g. of $V_2O_5$ were recovered from this acid solution, as determined by colorimetric analysis. Results are summarized in Table I.

*Table I*

| Batch | Time for solution to pass through column, min. | Amt. of $V_2O_5$ in effluent, g./l. | Amt. of $V_2O_5$ removed from solution | |
|---|---|---|---|---|
| | | | G. | Wt. percent |
| 1 | 20 | 0.71 | 0.033 | 31.6 |
| 2 | 22 | 0.95 | 0.009 | 8.7 |
| 3 | 22 | 1.00 | 0.004 | 3.8 |
| 4 | 22 | 1.02 | 0.002 | 1.9 |

From the data in Table I, it is seen that the lead substrate was substantially loaded with vanadium values after the first batch of pregnant liquor passed through it. By the time the fourth batch of pregnant liquor had run through the column, it had become loaded fairly completely since the effluent from the final run contained only 1.02 g./l. $V_2O_5$ as compared with the 1.04 g./l. $V_2O_5$ content of the original pregnant liquor.

EXAMPLE II

The column of substrate used in Example I was regenerated by passing through it 3 N aqueous $H_2SO_4$ to which had been added sufficient 30 wt. percent aqueous $H_2O_2$ to obtain a solution containing 4 wt. percent $H_2O_2$. This solution was left covering the lead substrate for 20 hours, during which time a white coating built up on the shot. After washing the treated lead shot with water, the column was then used to remove $V_2O_5$ from five 100 ml. batches of the same pregnant liquor used in Example I. The $V_2O_5$ content of the effluent from each batch was determined by colorimetric analysis. The column was then eluted with the vanadium-containing effluent obtained by eluting the column of Example I. The amount of $V_2O_5$ eluted by this elution step amounted to 0.048 g. Results are summarized in Table II.

*Table II*

| Batch | Time for solution to pass through column, min. | Amt. of $V_2O_5$ in effluent, g./l. | Amt. of $V_2O_5$ removed from solution | |
|---|---|---|---|---|
| | | | G. | Wt. percent |
| 1 | 25 | 0.095 | 0.0945 | 90.9 |
| 2 | 24 | 0.125 | 0.0915 | 87.0 |
| 3 | 23.5 | 0.450 | 0.0590 | 56.7 |
| 4 | 23 | 0.680 | 0.0360 | 34.6 |
| 5 | 25 | 0.730 | 0.0310 | 2.9 |

The data of Table II show that higher efficiencies are obtained when the lead substrate of this invention is prepared by using aqueous sulfuric acid containing hydrogen peroxide.

EXAMPLE III

A number of series of runs were carried out in which clean lead shot was treated with one of the following treating agents: (a) aqueous $H_2SO_4$, (b) aqueous $H_2O_2$, and (c) a mixture of aqueous $H_2O_2$ and aqueous $H_2SO_4$, and columns of the thus treated lead shot used to remove soluble vanadium values from pregnant carbonate leach liquor containing 1.0 g./l. $V_2O_5$.

In the 1st series of runs, the column of lead shot used was prepared by treating 275 g. of lead shot with 100 ml. of aqueous $H_2SO_4$, the latter having been made by mixing equal volumes of water and concentrated $H_2SO_4$ (36 N). The treating agent was allowed to stand in contact with the lead shot for 17 hours, after which the column was drained. The thus treated column of lead shot was washed with 100 ml. of water. Two 100 ml. batches of said pregnant liquor were then passed successively through the column and the $V_2O_5$ contents of the effluents determined. In these runs, and in the runs of the other series to be described, it was found that 25 ml. of liquid was held up in the column. After the 2nd run, the column was treated with 25 ml. of 1 N $H_2SO_4$ to convert the vanadium values to vanadic acid and to leave insoluble lead sulfate present on the lead shot. The cumulative loading of $V_2O_5$ in the column was calculated for this 1st series and found to be 0.025 g. Results are set forth in Table III.

The eluted column was then treated three times with 25 ml. of a 1:1 volume mixture of water and concentrated $H_2SO_4$, this treating agent standing in contact with the lead shot for 46 hours, after which the column was washed with 25 ml. of water. The thus treated column was then used in a 2nd series of runs to remove soluble vanadium values from three successive 100 ml. batches of said pregnant liquor. The cumulative loading of $V_2O_5$ in the column from this 2nd series of runs was found to be 0.065 g. Results of this 2nd series are set forth in Table III.

A second column containing 275 g. of lead shot was treated with 100 ml. of aqueous $H_2O_2$ containing 2.4 wt. percent $H_2O_2$ for 17 hours, after which the column was washed with 100 ml. of water. This treated column was then used to remove vanadium values from said pregnant liquor by successively passing through the column three 100 ml. batches of said pregnant liquor. The $V_2O_5$ contents of the effluents were determined. The column was eluted with 1 N $H_2SO_4$. The cumulative loading of the column from this 3rd series was calculated and found to be 0.045 g. $V_2O_5$. Results from this 3rd series are expressed in Table III.

The eluted column from the 3rd series of runs was treated three times with three 25 ml. portions of aqueous $H_2O_2$ having a total treating time of 46 hours, after which the column was washed with 25 ml. of water. The thus treated column was then used to remove vanadium values from four successive 100 ml. batches of said pregnant liquor. The $V_2O_5$ contents of the effluents were determined and the cumulative loading of $V_2O_5$ in the column after this 4th series or runs was calculated and found to be 0.085 g. Results are expressed in Table III.

A third column containing 275 g. of lead shot was treated with 100 ml. of a 1:1 volume mixture of water and concentrated $H_2SO_4$ containing 2.4 wt. percent $H_2O_2$. After a total treating time of 17 hours, the column was washed with 100 ml. of water. The thus prepared column was used to remove vanadium values from four successive 100 ml. batches of said pregnant liquor. The $V_2O_5$ contents of the effluents were determined and the column eluted with 1 N $H_2SO_4$. The cumulative loading of the column from this 5th series of runs was calculated and found to be 0.075. Results are expressed in Table III.

The column used in said 5th series of runs was regenerated by contacting the lead shot three times with three 25 ml. portions of said $H_2O_2$-$H_2SO_4$ aqueous mixture with a total treating time of 46 hours, after which the excess treating agent was removed by a 25 ml. water wash. This regenerated column was then used to remove $V_2O_5$ from nine successive 100 ml. batches of said pregnant liquor. The $V_2O_5$ contents of the effluents were determined and the cumulative loading of $V_2O_5$ in the column after the rest of these batches was passed therethrough was calculated and found to be 0.322 g. Results are expressed in Table III.

*Table III*

| Run | Agent used to treat lead shot | Time for solution to pass thru column, min. | Amt. of $V_2O_5$ in effluent, g./l. | Cumulative $V_2O_5$ loading of column, g. |
|---|---|---|---|---|
| 1st series, using lead shot treated for 17 hrs. | | | | 0.025 |
| 1 | Aq. $H_2SO_4$ | 19 | 0.5 | |
| 2 | Aq. $H_2SO_4$ | 19.5 | 1.0 | |
| 2nd series, using lead shot treated for 46 hrs. | | | | 0.065 |
| 3 | Aq. $H_2SO_4$ | 15.4 | 0.2 | |
| 4 | Aq. $H_2SO_4$ | 17 | 0.9 | |
| 5 | Aq. $H_2SO_4$ | 18.5 | 1.0 | |
| 3rd series, using lead shot treated for 17 hrs. | | | | 0.045 |
| 6 | Aq. $H_2O_2$ | 21.5 | 0.4 | |
| 7 | Aq. $H_2O_2$ | 17.5 | 0.9 | |
| 8 | Aq. $H_2O_2$ | 18 | 1.0 | |
| 4th series, using lead shot treated for 46 hrs. | | | | 0.085 |
| 9 | Aq. $H_2O_2$ | 14.5 | 0.2 | |
| 10 | Aq. $H_2O_2$ | 16.3 | 0.8 | |
| 11 | Aq. $H_2O_2$ | 16.7 | 0.9 | |
| 12 | Aq. $H_2O_2$ | 16.7 | 1.0 | |
| 5th series, using lead shot treated for 17 hrs. | | | | 0.075 |
| 13 | Aq. $H_2O_2$+Aq. $H_2SO_4$ | 17.5 | 0.3 | |
| 14 | Aq. $H_2O_2$+Aq. $H_2SO_4$ | 16 | 0.8 | |
| 15 | Aq. $H_2O_2$+Aq. $H_2SO_4$ | 16 | 0.9 | |
| 16 | Aq. $H_2O_2$+Aq. $H_2SO_4$ | 17 | 1.0 | |
| 6th series, using lead shot treated for 46 hrs. | | | | 0.322 |
| 17 | Aq. $H_2O_2$+Aq. $H_2SO_4$ | 14.5 | 0.05 | |
| 18 | Aq. $H_2O_2$+Aq. $H_2SO_4$ | 15.8 | 0.8 | |
| 19 | Aq. $H_2O_2$+Aq. $H_2SO_4$ | 15.8 | 0.3 | |
| 20 | Aq. $H_2O_2$+Aq. $H_2SO_4$ | 15.3 | 0.6 | |
| 21 | Aq. $H_2O_2$+Aq. $H_2SO_4$ | 15.5 | 0.8 | |
| 22 | Aq. $H_2O_2$+Aq. $H_2SO_4$ | 15.6 | 0.9 | |
| 23 | Aq. $H_2O_2$+Aq. $H_2SO_4$ | 15.3 | 0.9 | |
| 24 | Aq. $H_2O_2$+Aq. $H_2SO_4$ | 15.8 | 0.9 | |
| 25 | Aq. $H_2O_2$+Aq. $H_2SO_4$ | 15.6 | 1.0 | |

The data of Table III show that columns of lead shot treated with solutions comprising $H_2O_2$ (3rd, 4th, 5th, and 6th series) were more effective in removing $V_2O_5$ from the pregnant liquor than those columns prepared by treating the lead shot with aqueous $H_2SO_4$ (1st and 2nd series). In addition, the data show that an aqueous mixture $H_2O_2$ and $H_2SO_4$ (5th and 6th series) effects even greater removal of $V_2O_5$. The above-described cumulative column loadings of $V_2O_5$ for each series also shows that aqueous $H_2O_2$, especially an aqueous mixture of $H_2O_2$ and $H_2SO_4$, is more effective.

Various modifications and alterations of this invention will become apparent to those skilled in the art, without departing from the scope and spirit of this invention, and it should be understood that this invention is not to be limited unduly to those preferred embodiments set forth herein for illustrative purposes.

We claim:
1. A method of removing soluble vanadium values from the pregnant uranium-containing liquor of the carbonate leaching process, which comprises passing liquor through a liquid permeable bed comprising a substrate of lead shot the surfaces of which have been contacted with an aqueous sulfuric acid solution of hydrogen peroxide, and eluting the vanadium values from the resulting lead vanadate-loaded substrate by passing a dilute solution of sulfuric acid through said loaded substrate.

2. A method for removing soluble vanadium values from an aqueous basic solution containing the same, which comprises passing said solution through a liquid permeable bed comprising a substrate of discrete bodies of metallic lead which have been treated with an aqueous sulfuric acid solution containing hydrogen peroxide, and eluting the vanadium values from the resulting lead vanadate-loaded substrate by passing an acid eluting agent for said lead vanadate through said loaded substrate.

References Cited by the Examiner

UNITED STATES PATENTS

| 1,129,029 | 2/15 | Vogt | 23—14.5 |
| 2,442,429 | 6/48 | Nye et al. | 23—14.5 |
| 2,583,591 | 1/52 | Perren et al. | 23—51 |
| 2,654,653 | 10/53 | Nye et al. | 23—14.5 |
| 2,937,074 | 5/60 | Abrams | 23—23 X |

OTHER REFERENCES

Mellor, "Comprehensive Treatise on Inorganic and Theoretical Chemistry," vol. 7, pages 565, 574–576, 804 (1927).

Mellor, "Comprehensive Treatise on Inorganic and Theoretical Chemistry," volume 9, pages 753, 754 (1929).

RMO–2619, pp. 1–42, June 1955.

Nuclear Science Abstracts, vol. 11, No. 990, Jan. 31, 1957, which reports AEC Document RMO–2619 to Clifford et al., June 1955.

CARL D. QUARFORTH, *Primary Examiner.*